June 21, 1932.  H. K. BARNES  1,864,115
VEHICLE BRAKE
Filed Aug. 29, 1930  3 Sheets-Sheet 1
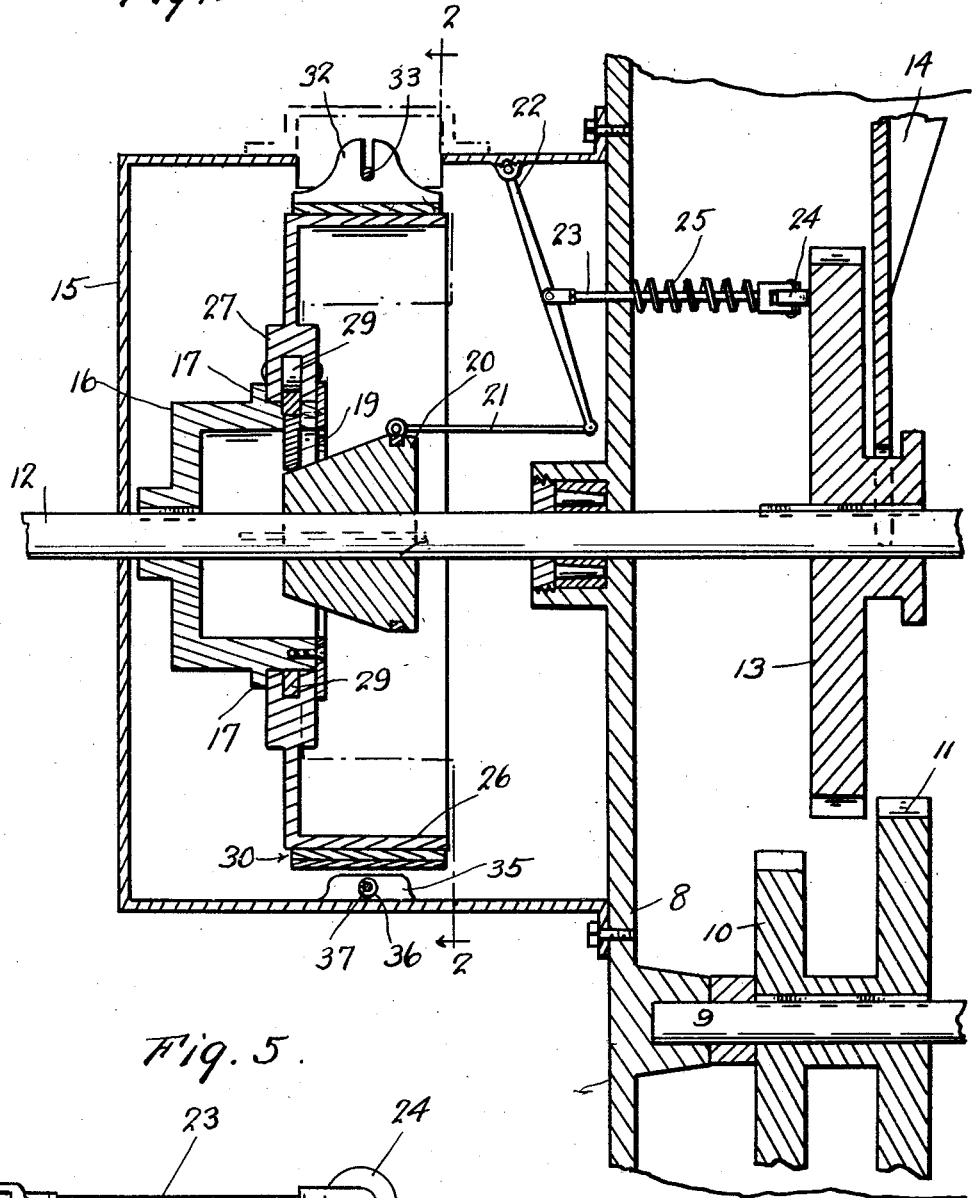
Fig. 1.
Fig. 5.
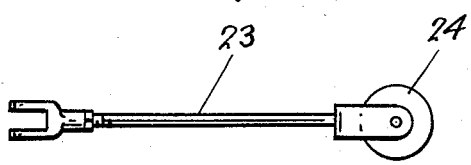
Inventor
H. K. Barnes
By *Clarence A. O'Brien*
Attorney Inventor
H. K. Barnes June 21, 1932.  H. K. BARNES  1,864,115
VEHICLE BRAKE
Filed Aug. 29, 1930   3 Sheets-Sheet 3

Inventor

H. K. Barnes

By *Clarence A. O'Brien*
Attorney

Patented June 21, 1932

1,864,115

UNITED STATES PATENT OFFICE

HYRUM K. BARNES, OF OGDEN, UTAH

VEHICLE BRAKE

Application filed August 29, 1930. Serial No. 478,750.

This invention relates to a supplementary brake for use in association with present day motor vehicles and has more particular reference to an extra brake of an automatically operable type which is associated with the drive shaft in such a manner as to prevent the car from accidentally rolling back while on an incline, hill, or the like.

More specifically stated, I have developed a brake construction which is associated with the reverse gear and the adjacent portion of the drive shaft in such a manner as to permit rotation of the drive shaft in the direction allowing forward motion of the car, but preventing retrograde rotation of said shaft if the car tends to gravitate backwards down a hill or incline.

In carrying the inventive conception into practice I have evolved and produced a novel organization of details constituting the improved brake construction wherein the arrangement permits unhampered forward travel of the car, prevents retrograde backing on an incline while shifting gears and engaging the clutch, and permits proper manipulation of the reverse gear when it is desired to back the car.

The particular details and their relative arrangement and association will become more readily apparent from the following description and drawings.

In the accompanying drawings in which like numerals are used to designate like parts throughout the same:

Figure 1 is a view in section and elevation showing the general assembly with the brake normally engaged.

Figure 5 is an elevational view of the actuator for the cone operating linkage.

Figure 2:
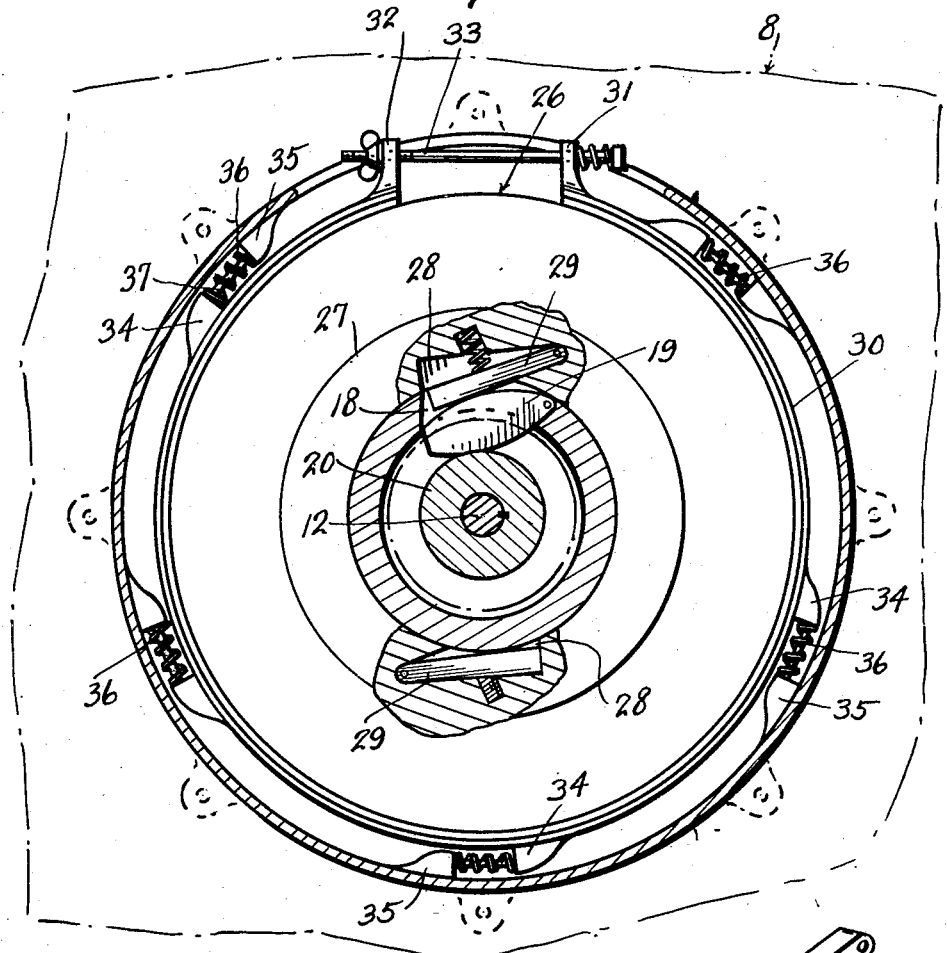
Figure 2 is a vertical section on the line 2—2 of Figure 1.
Figure 3:
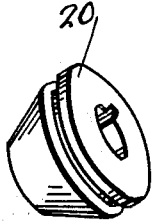
Figure 3 is a perspective view of an expanding cone.
Figure 4:
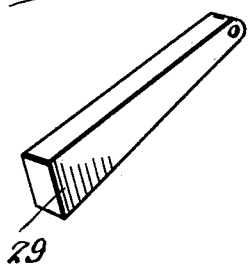
Figure 4 is a perspective view of one of the ratcheting pawls.

The general assembly may well be observed in Figure 1. Referring to this figure it will be noted that the numeral 8 designates the transmission housing. In this is the transmission shaft 9 and associated gears 10 and 11. Also projecting into the transmission housing is the drive shaft 12 here shown as equipped with the reverse gear 13 and the associated shifting arm 14. These are conventional details. It will of course be understood that when the gear 13 is in reversing position it meshes with an idle gear not shown which meshes with the gear 10.

The improved structure embodies a casing 15 of appropriate configuration which is bolted or otherwise fastened to the transmission housing as shown and which is provided with an opening to accommodate the shaft 12. Confined in the casing and keyed on the shaft 12 for rotation therewith is a cup-like ratchet 16 which is provided with a peripheral circumferential flange 17 and said member 16 is also formed with a peripheral opening one end 18 of which constitutes an abutment. Pivoted on this ratchet for swinging motion into the opening 18 is a pawl releasing cam 19. This is actuated through the medium of a slidable expanding cone 20 slidable on the shaft 12 and projectable into the hollow portion of the cup 16 for cam engagement with the swingable cam 19. In this connection I invite attention to the linkage embodying the link 21 operatively connected to the cone and in turn operatively connected with an associated or companion link 22 pivotally suspended at the top of the casing. Attached to the intermediate portion of this link 22 is the forked end of an actuating arm 23 which projects through the transmission casing and is provided with a fork on the opposite end carrying an anti-friction roller 24 in contact with the reverse gear 13. The numeral 25 designates a coiled returning spring for normally disengaging the cone 20 through the medium of the associated linkage.

I next call attention to the brake drum 26. This includes a reinforced or enlarged annular portion 27 which surrounds the ratchet cup 16 and bears against the stop flange 17. This annulus 27 is formed with a pair of diametrically opposite pockets or recesses 28 which serve to accommodate the spring pressed pawls 29. These pawls are designed to ride around the ratchet cup 16 so long as the car is travelling in a forward direction but when, however, the car gravitates rearwardly retrograde action is prevented by the pawl engaging the shoulder 18 as is obvious from Figure 2. Incidentally the cam 19 is normally weighted to drop into an ineffective state under normal running conditions. Thus the brake is normally applied, no braking action however occurring unless retrograde motion of the machine develops. In other words, the brake permits unhampered forward movement of the machine but prevents backward movement thereof on an incline or a hill.

Figure 6:
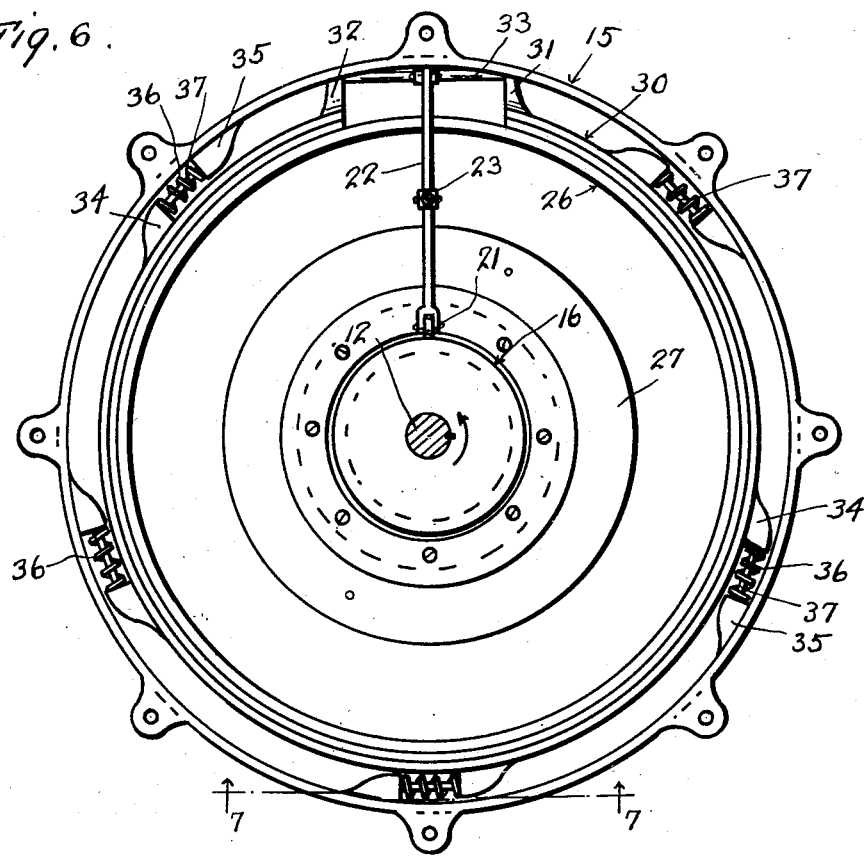
Figure 6 is an elevational view.
Figure 7:
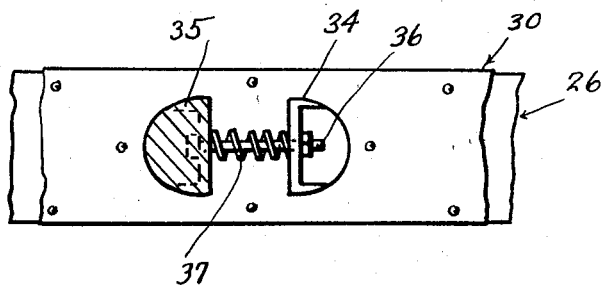
Figure 7 is a detail horizontal section on the line 7—7 of Figure 6.

Surrounding the peripheral flange of the brake drum is a brake band generally represented by the numeral 30. The brake band is provided with spaced lugs 31 and 32 accommodating the tie bolt 33. The bolt is adjusted to maintain the frictional grip of the band on the drum. The brake band is suspended from the casing through the medium of the associated pairs of lugs, one lug of each pair as at 34 being carried by the band and an associated lug 35 on the casing. These are joined together through the medium of a bolt 36 (see Figure 7) and surrounding this bolt between the lugs is a coiled slack takeup spring 37. It is evident that the brake band is constantly engaged with the brake drum and these parts are yieldably suspended from the casing 15, the casing being rigidly attached to the transmission housing 8. Thus the shaft 12 is permitted to rotate as usual carrying the cup 16 around with it in the direction of the arrow indicated in Figure 6. This is the normal forward direction of rotation and the pawl and ratchet mechanism does not interfere at this time. Reverse motion of the shaft however caused by backward drifting of the car on an incline immediately brings the pawl and ratchet mechanism into play to provide the desired braking action at this time. Inasmuch as the brake is normally engaged to accomplish this result it is obvious that the linkage and operating arm 23 is necessary so that when the shifting arm 14 is brought into play and the gear 13 is shifted for throwing the car into reverse, the cone will simultaneously come into play for swinging the cam 19 outwardly to prevent engagement of the pawl 29 with the ratchet shoulder 18.

It is thought that persons skilled in the art to which the invention relates will be able to obtain a clear understanding of the invention after considering the description in connection with the drawings. Therefore, a more lengthy description is regarded as unnecessary.

Minor changes in shape, size, and rearrangement of details coming within the field of invention claimed may be resorted to in actual practice if desired.

What is claimed is:

1. A supplemental brake construction comprising, in combination, a transmission housing, a casing fixedly supported thereon, a drive shaft rotatable in the casing and housing, a brake band suspended in said casing, a brake drum confined within said band, and a pawl and ratchet connection between the drum and shaft, a reverse gear on said shaft, a pivotally mounted releasing cam associate with the pawls, a slidable conical expander carried by said shaft and engageable with said releasing cam, and an operating connection between said expander and the reverse gear whereby when the reverse gear is brought into play, the expander will disengage the pawl and ratchet mechanism to temporarily release the brake while backing the vehicle.

2. In a structure of the class described, in combination, a transmission housing, a shaft mounted thereon, gears carried by said shaft, a casing attached to said housing and projectable externally therefrom, a second shaft mounted for rotation in the housing and casing respectively, a reverse gear thereon cooperable with said first named gear, a shifting arm for said reverse gear, a ratchet device fixedly mounted on said second named shaft and confined in said casing, a trip cam swingably mounted on said device, an expanding cone engageable with said trip cam, said cone being slidably mounted on said second named shaft, a link suspended in said casing, a second link connected thereto and operatively connected with said expanding cone, an arm pivotally connected with the first named link projectable slidably through an opening in the transmission housing to close proximity with said reverse gear, an anti-friction roller carried by said arm and in contact with said gear, a return spring surrounding said arm and engaging the transmission housing to maintain the roller in constant yieldable contact with said reverse gear and to normally disengage the expanding cone from said trip cam, a brake drum surrounding said ratchet device, spring pressed pawls carried by said drum and engageable with said device and associated with said cam, a brake band surrounding said drum and suspended within said casing.

3. An attachment for a transmission device including a drive chaft comprising a casing, a brake band yieldably suspended in said casing, a brake drum, said brake band embracing said brake drum, a ratchet device attached to the drive shaft, a swingably mounted releasing cam carried by said device, spring pressed pawls carried by said brake drum and cooperable with said ratchet device and associated with said releasing cam, and means for moving the cam to a position where it will move the pawls to inoperative position.

4. An attachment for a transmission, the device including a drive shaft comprising a casing, a brake band yieldably suspended in said casing, a brake drum, said brake band embracing said brake drum, a ratchet device, attached to said shaft, a swingably mounted releasing cam carried by said device, a spring pressed pawls carried by said brake drum and cooperable with said ratchet device and associated with said releasing cam, a conical expander adapted for sliding movement on the drive shaft for operating the cam, linkage connected therewith and suspended in said casing, and a spring returned arm associated with the linkage and cooperable with the reverse gear in the manner specified.

5. In a structure of the class described, in combination, a transmission housing, a casing attached thereto, a shaft mounted for rotation in bearings in the casing and housing, a reverse gear on said shaft, a cup-like ratchet device fixedly mounted on said shaft and confined within said casing and rotatable continuously with the shaft, said device being formed with a flanged rim having an opening therein constituting an abutment, a weighted cam pivotally mounted on the rim and projectable into said opening, a cone slidable on said shaft and engageable with said cam, a brake drum including an annular portion surrounding the cup-like device, a pair of diametrically opposite spring pressed pawls mounted in pockets in said annular portion and cooperable with the cup-like device, said abutment and said releasing cam, a brake band suspended in the casing and embracing the brake drum, and an operating connection between the expanding cone and the reverse gear.

In testimony whereof I affix my signature.

HYRUM K. BARNES.